(12) United States Patent
Harris et al.

(10) Patent No.: US 11,037,232 B2
(45) Date of Patent: Jun. 15, 2021

(54) SMART MEMBERSHIP MANAGEMENT

(71) Applicant: Microsoft Technology Licensing, LLC, Redmond, WA (US)

(72) Inventors: Jonathan Harris, Redmond, WA (US); Brian Stucker, Redmond, WA (US); Eric Freistadt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 15/615,204

(22) Filed: Jun. 6, 2017

(65) Prior Publication Data
US 2018/0349985 A1 Dec. 6, 2018

(51) Int. Cl.
| | |
|---|---|
| *G06Q 40/02* | (2012.01) |
| *G06F 3/048* | (2013.01) |
| *H04L 29/06* | (2006.01) |
| *G06Q 20/34* | (2012.01) |
| *G06Q 20/10* | (2012.01) |
| *G06Q 20/40* | (2012.01) |
| *G06F 21/62* | (2013.01) |
| *G06Q 10/10* | (2012.01) |
| *G07F 7/08* | (2006.01) |

(52) U.S. Cl.
CPC ............ *G06Q 40/02* (2013.01); *G06F 3/048* (2013.01); *G06F 21/6245* (2013.01); *G06Q 10/107* (2013.01); *G06Q 10/109* (2013.01); *G06Q 20/102* (2013.01); *G06Q 20/3572* (2013.01); *G06Q 20/40* (2013.01); *H04L 63/083* (2013.01); *G07F 7/08* (2013.01)

(58) Field of Classification Search
CPC ..................................................... G06Q 40/02
USPC ............................................................ 705/39
See application file for complete search history.

(56) References Cited

U.S. PATENT DOCUMENTS

| | | | |
|---|---|---|---|
| 6,360,254 B1 | 3/2002 | Linden | |
| 8,832,205 B2 * | 9/2014 | Nelson | ................ G06Q 10/109 709/203 |
| 9,077,759 B2 | 7/2015 | Brouwer | |
| 9,197,700 B2 | 11/2015 | Brouwer | |

(Continued)

FOREIGN PATENT DOCUMENTS

WO 2015008075 A1 1/2015

OTHER PUBLICATIONS

"Office Action Issued in European Patent Application No. 18727584.7", dated Nov. 19, 2020, 9 Pages.

(Continued)

*Primary Examiner* — Cho Kwong
(74) *Attorney, Agent, or Firm* — Merchant & Gould P C.

(57) ABSTRACT

Examples of the present disclosure relate to systems and methods for managing membership information. In an example, membership information relating to a service comprising authentication information, billing details, among other information may be identified within an electronic communication from a service and stored. In addition, reminders regarding important dates (such as auto-renewal dates) for a membership may be generated, communication from services may be sorted by service type or service provider, or a user may easily unsubscribe from a service. Additional/alternative aspects of the technology may relate to managing information related to one or more memberships.

20 Claims, 13 Drawing Sheets

(56) References Cited

U.S. PATENT DOCUMENTS

2014/0245411 A1 8/2014 Meng
2016/0196012 A1 7/2016 Wilder et al.
2017/0011214 A1* 1/2017 Cavanagh .............. G06F 21/46

OTHER PUBLICATIONS

"International Search Report and Written Opinion Issued in PCT application No. PCT/US2018/831922", dated Jul. 6 2018, 14 Pages.
Ben, "Manage Multiple Accounts with the MailChimp Keychain", published Jul. 13, 2009, 3 pages.
Sheehan, "How to fix Apple mail not saving passwords—Keychain first aid", published Jun. 23, 2009, 28 pages.
Robot Cloud, "Updating Keychain After a Password Change", published Jun. 22, 2013, 2 pages.
Breen, "How to keep iCloud Keychain from adding old email accounts", published Nov. 10, 2014, 3 pages.
Breen, "How to manage passwords with Keychain Access", published Nov. 15, 2012, 5 pages.

* cited by examiner

SMART MEMBERSHIP MANAGEMENT

BACKGROUND

Companies providing content via the Internet often find it useful to restrict access to information. For example, memberships are used by retailers, banks, social media platforms, content creation and/or distribution companies, etc., to allow users access to information.

A user of the Internet, however, is faced with managing each membership. This includes recalling usernames and/or passwords, remembering to cancel and/or renew a membership, and/or monitoring communication from companies. As such, management of this information may become difficult.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the technology may relate to management of memberships. For example, the technology may be used to store a user's authentication information for one or more memberships. In addition, a user may set reminders regarding important dates (such as auto-renewal dates) of a membership, sort communication by service, and easily unsubscribe from a membership.

The technology disclosed herein may provide for, in part, automatically performing these and other functions. To accomplish such functions, aspects of the technology may relate to parsing an incoming electronic communication, such as an email, to determine whether the electronic communication relates to a membership. Additionally, parsing may determine whether the electronic communication includes a username, a password, an unsubscribe feature, an auto-renewal feature, and/or other information related to the membership.

Additional/alternative aspects of the technology may relate to managing information related to one or more memberships. For example, aspects of the technology may include allowing a user to store/change authentication information, unsubscribe from a membership, or calendar auto-renewal dates and the like.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Figure 1:
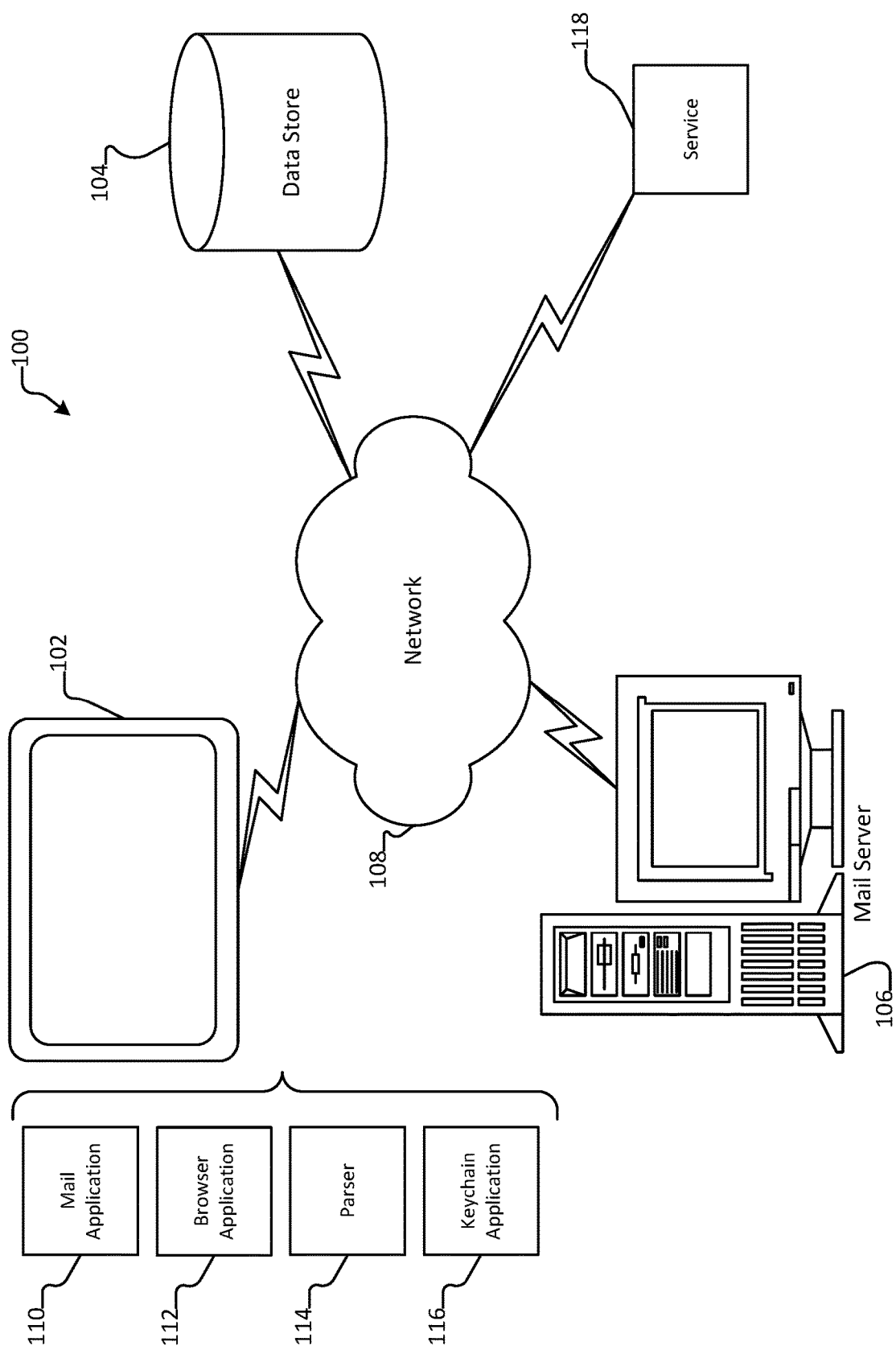
FIG. 1 illustrates an overview of an example networked-computing environment for managing membership information.

FIG. 1 illustrates an overview of an example networked-computing environment 100 for managing membership information. As illustrated, FIG. 1 includes a computing device 102, a data store 104, a mail server 106, and a membership provider 118, each of which may be communicatively coupled to each other via a network 108.

The computing device 102 may be any suitable type of computing device. For example, the computing device 102 may be a desktop computer, a laptop computer, a tablet, a mobile telephone, a smart phone, a wearable computing device, or the like. Additionally, aspects of the current technology include the computing device 102 storing a mail application 110, a browser application 112, a parser 114, and a keychain application 116. The networked-computing environment 100 may also include a data store 104, a mail server 106, and a service 118. In an example, the network 108 may facilitate communication between devices, such as computing device 102, data store 104, and mail server 106. The network 108 may include the Internet and/or any other type of local or wide area networks. Communication between devices allows for the exchange of queries, information related to the corpus of electronic objects, relevant passages, and other information. In some examples, the service 118 may make one or more computing resources available on the network 108, such as a website, a file server, a video streaming service, a cloud-based productivity software suite, among others.

A mail application 110 may be software used to access a mailbox, emails, or other electronic communications. In an example, the mail application 110 may be an application (e.g., MICROSOFT OUTLOOK, MOZILLA THUNDERBIRD, etc.), a web-based application (e.g., MICROSOFT OUTLOOK.COM, GOOGLE GMAIL, YAHOO MAIL, etc.), or any other application or service used to send and receive electronic communications. In an example, the mail application 110 may comprise a server component, which is used to send and receive communications. In another example, the mail application 110 may communicate with one or more local or remote computing devices, applications, or services in order to send and receive communications. As an example, the mail server 106 may send and/or receive electronic communications, which may be accessed by the mail application 110 of computing device 102 using network 108.

A service 118 may provide one or more services to a user. In an example, the user may register with the service 118 in order to receive or access the services. In some examples, the service 118 may provide the services in exchange for a recurring payment or subscription fee. The service 118 may be associated with a website at which a user may complete a registration process. The registration process may comprise creating an account with the service 118, wherein information may be collected from the user (e.g., a username, a password, contact information, etc.). In an example, billing information may be collected during the registration process, which may be used by the service 118 in order to collect a subscription fee (e.g., a one-time fee, a periodic fee, an automatically-renewing fee, etc.). The service 118 may generate and store information during the registration process, including, but not limited to, a membership identification number, membership information comprising at least a part of the information received from the user, a customer profile, etc.

A browser application 112 may be an internet browser used to interact with remote information. A user may input information into the browser application 112 through a variety of means including text, touch, gesture, or spoken language. In an example, the browser application 112 may access one or more websites through the network 108. In some examples, the browser application 112 may be used to access a website associated with the service 118. Using the browser application 112, a user may provide information to the website in order to complete a registration process with service 118, including, but not limited to, credentials, identification information, billing information, or contact information.

When the service 118 receives registration information, the service 118 may generate an email, an instant message, or other electronic communication based on the received information. In an example, the electronic communication may comprise an order number, a membership identification number, billing confirmation information, at least a part of the provided registration information, or other membership information. The electronic communication may be communicated using the network 108 to a user's device (e.g., it may be received by the computing device 102 using the mail application 110). In another example, the electronic communication may be received by the mail server 106, which may be accessed by the mail application 110 on the computing device 102.

A parser 114 may be housed on the computing device 102. In aspects, the parser may use natural language understanding techniques, a pattern recognition engine, or other techniques in order to determine whether an electronic communication relates to a membership. The parser 114 may determine whether an electronic communication relates to a membership based on any of a variety of techniques, including, but not limited to, keyword analysis, evaluating information relating to the sender, or identifying a pattern of communication (e.g., the periodic receipt of a billing statement or invoice, occasional membership renewal or membership benefit reminders, etc.). As will be appreciated, while the parser 114 is illustrated as part of the computing device 102, the parser 114 may be provided or implemented by any other computing device, including, but not limited to, the mail server 106, a stand-alone computing device, a distributed computing system, or a tenant of a virtualized computing environment.

In an example, the parser 114 may analyze at least some of the received electronic communications (e.g., as may be received by the mail application 110 and/or the mail server 106) to identify messages that include information relating to a membership. For example, the parser 114 may identify an email that includes keywords such as "membership," "account," "password," and the like. Additionally or alternatively, the parser may identify the semantic meaning of natural language in the surface forms (such as text) to determine whether the email relates to a membership. When an email or other electronic communication relates to a membership, the parser 114 may extract information relating to the membership, including, but not limited to, a username, a password, a website URL or other access information (e.g., to manage the user's account, contact customer support, unsubscribe from the service, etc.), or billing information.

Additionally, a keychain application 116 may be stored by the computing device 102. In aspects of the technology, the keychain application 116 may store, organize, or manage membership information relating to one or more services for which a user has registered (e.g., service 118). In an example, the keychain application 116 may generate one or more membership profiles relating to a membership. As an example, the keychain application 116 may create a membership profile for a membership with the service 118 based on information received from the parser 114. In some examples, the keychain application 116 may receive or analyze information from other sources, including, but not limited to, the browser application 112, the mail application 110, or other applications, services, data stores, or storage systems, among other information sources. In an example, the keychain application 116 may access information stored by the browser application 112 (e.g., stored usernames, passwords, cached information, website history, etc.) and evaluate the accessed information and the information obtained from an electronic communication (e.g., as obtained by the parser 114 from an email message, for example) to generate a membership profile relating to the user's membership with the service 118.

The keychain application 116 may store at least a part of the membership profiles in a data store or other storage system that is local to computing device 102 (e.g., a hardware storage device, a local database, a file, etc.). In another example, at least a part of the information generated or accessed by the keychain application 116 may be stored or accessed remotely (e.g., using data store 104). Data store 104 may be a networked storage system, a distributed storage system, a file share, a database, or other application executing on a remote computing device. As such, when information is accessed using the keychain application 116, keychain application 116 may request information from data store 104. Similarly, the keychain application 116 may provide information (e.g., received information from the parser 114 or the mail application 110, at least a part of a membership profile, etc.) to data store 104 for storage and later retrieval.

Figure 2:
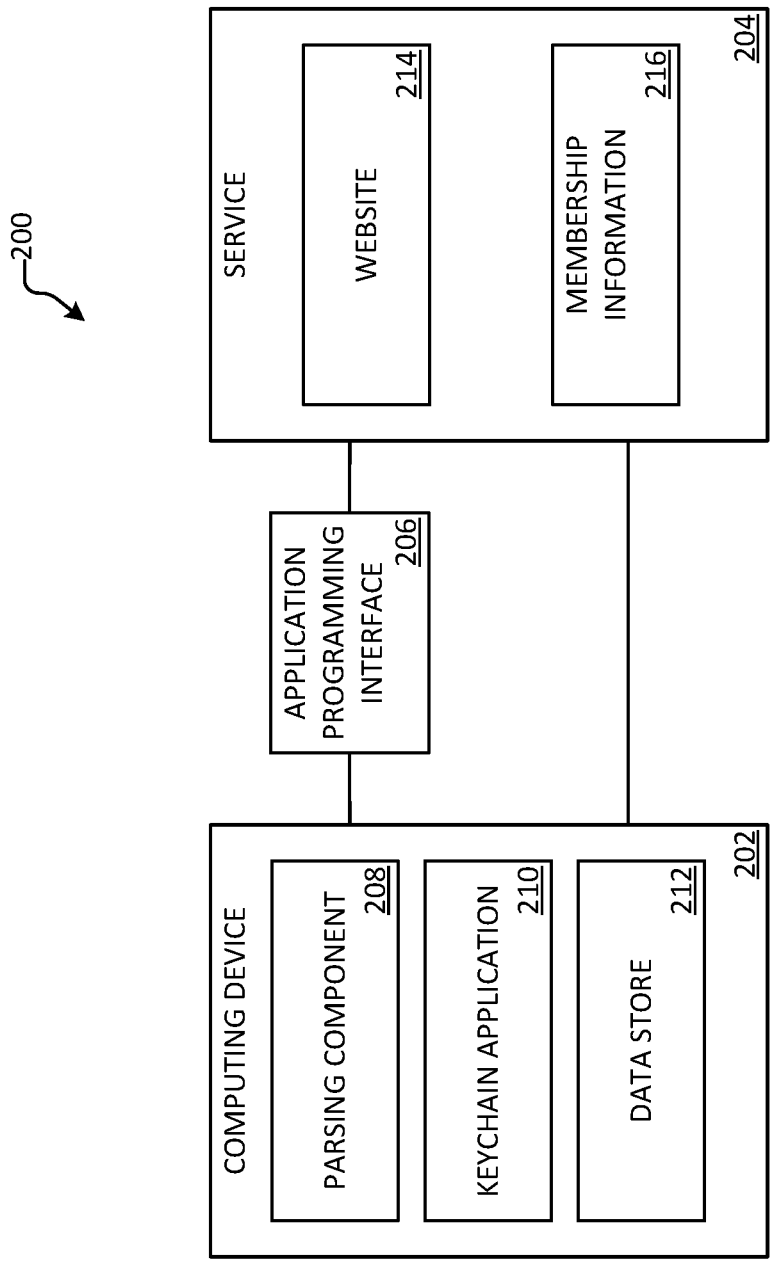
FIG. 2 illustrates an overview of an example system for generating and storing a membership profile relating to membership information.

FIG. 2 illustrates an overview of an example system 200 for generating and storing a membership profile relating to membership information. The system 200 may be comprised of a computing device 202, a service 204, and an application programming interface 206. In an example, the computing device 202 may be the computing device 102 in FIG. 1. The computing device 202 is comprised of a parsing component 208, a keychain application 210, and a data store 212. In some examples, the parsing component 208 may be the parser 114 and/or the keychain application 210 may be the keychain application 116 in FIG. 1. The data store 212 may be a storage system, a hardware storage device, a file, a database, or other storage. In an example, the data store 212 may be local to the computing device 202. As will be appreciated, while the data store 212 is illustrated as a part of the computing device 202, the data store 212 may be storage that is remote to the computing device 202, such as a distributed storage system or a cloud-based data store (e.g., the data store 104 in FIG. 1), among others.

In an example, the service 204 may be the service 118 in FIG. 1. As illustrated, the service 204 is comprised of a website 214 and membership information 216. The website 214 may be a website with which the service 204 is associated. In some examples, the website may comprise information relating to the service 204, including, but not limited to, content for which users of the service 204 may subscribe, information relating to the service 204, or a registration process as disclosed herein, among other information. The membership information 216 may comprise information received from one or more users of the service 204. In an example, the membership information 216 may comprise information received from a user completing a registration process.

As discussed above with respect to FIG. 1, a user may register for a membership with the service 204 (e.g., using a browser or other application executing on computing device 202). As a result of completing the registration process, information relating to or provided by the user may be stored as part of the membership information 216. Further, the service 204 may transmit an electronic communication from the service 204 to the user (e.g., to the user's email account, instant message account, telephone number, etc.). The electronic communication may be accessed or received by the computing device 202 (e.g., using a mail application such as the mail application 110 in FIG. 1). The computing device 202 may parse the electronic communication using the parsing component 208, which may determine whether the electronic communication relates to a membership.

If it is determined that the electronic communication relates to a membership, information may be identified within the electronic communication relating to the membership, including, but not limited to, a username, a password, a membership identification number, billing details, or contact information, among other membership information. This information may be provided to or accessed by the keychain application 210, which may generate a membership profile containing at least a subpart of the information. In some examples, one or more calendar entries or reminders may be generated based on at least a subpart of the information (e.g., relating to a renewal date, a cancellation date, a billing date, etc.).

In an example, the keychain application 210 may access additional information relating to the membership when generating the membership profile. An application programming interface 206 may provide an interface or other protocol that may be used to access information from the service 204 relating to a membership. In an example, the application programming interface 206 may be an application programming interface (API) that is specific to the service 204 (e.g., developed or defined by the service 204), or it may be a standardized API or protocol. As an example, the keychain application 210 may use the application programming interface 206 to retrieve membership information from the service 204, including, but not limited to, a password, an authentication token, billing information, or contact information. In some examples, non-confidential information may be received from the service 204 in an electronic communication (e.g., a username, a membership identification information, etc.) while confidential information may be accessed by way of the application programming interface 206 (e.g., password information, billing details, etc.).

In another example, the service 204 may provide an indication relating to the application programming interface 206 in the electronic communication, such as a specific uniform resource locator (URL) that can be used to access the application programming interface 206, protocol information (e.g., the type of protocol, commands that may be executed, expected response types, etc.), or other information. As will be appreciated, while the application programming interface 206 is referred to as an API in the above example, the application programming interface 206 may be any of a variety of possible protocols, standards, or other communication techniques with which to communicate information within a computer network.

Once the keychain application 210 has gathered information relating to the membership, the keychain application 210 may generate a membership profile for the membership comprising at least a subpart of the gathered information. In an example, the membership profile may be stored in the data store 212. As discussed above, the data store 212 may be a local or remote storage system. In some examples, the membership profile may be stored so that at least a portion of the membership profile is encrypted, password-protected, or otherwise access-restricted.

Figure 3:
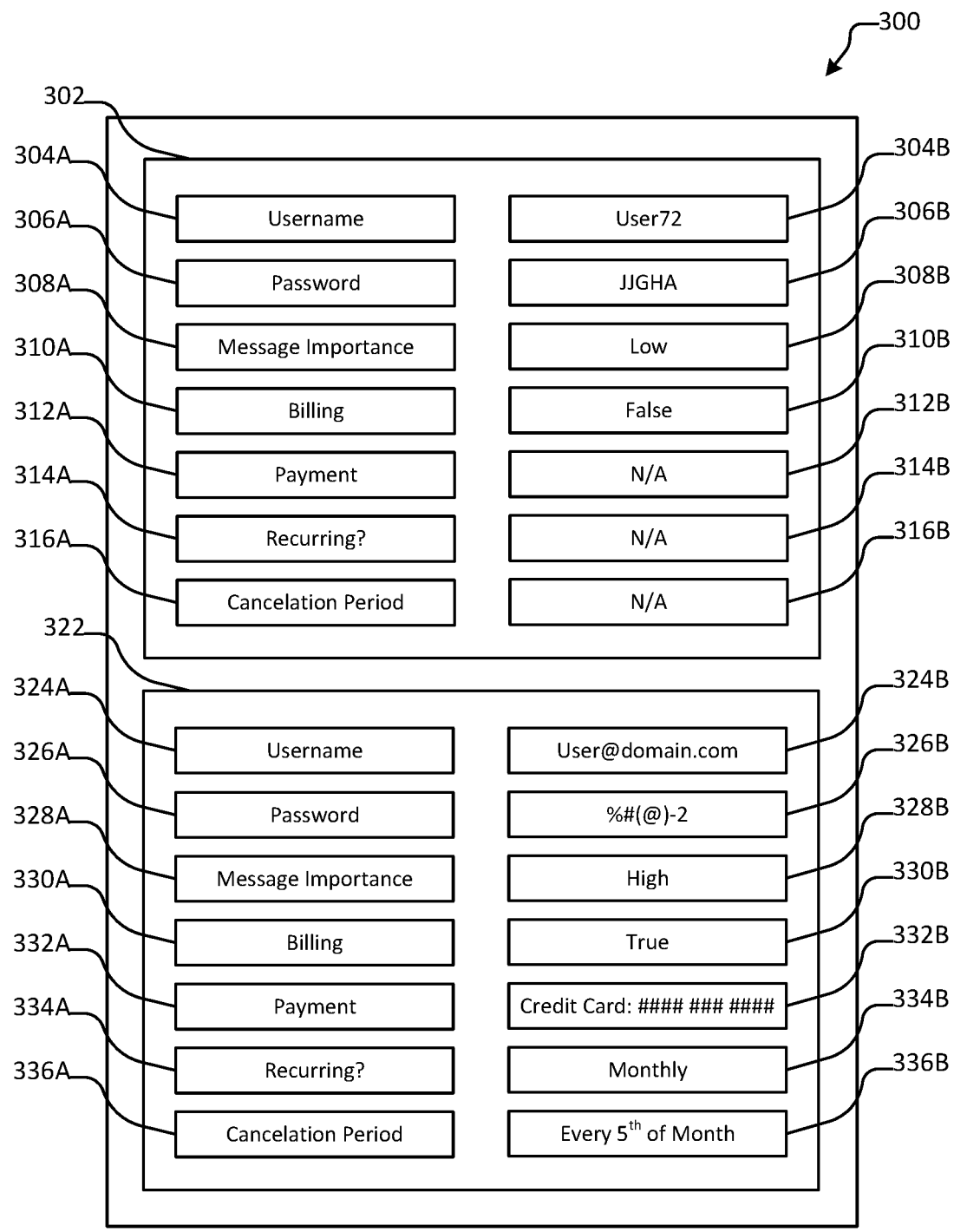
FIG. 3 illustrates an overview of an example keychain data store for managing membership information.

FIG. 3 illustrates an overview of an example keychain data store 300 for managing membership information. A keychain data store 300 may be comprised of one or more membership profiles (e.g., a membership profiles 302 and 322). As described above, the membership profiles 302 and 322 may comprise information relating to a membership with a service. The keychain data store 300 may be stored using any of a variety of techniques, including, but not limited to, in a database, using a locally or remotely accessible storage device, or using a distributed storage system. In some examples, a first subpart of the keychain data store 300 may be stored locally, while a second subpart of the keychain data store may be stored remotely. As will be appreciated, the first and second subparts need not be mutually exclusive. In some examples, the keychain data store 300 may store additional information relating to one or more membership profiles, such as metadata, cryptographic information (e.g., signatures, hashes, certificates, etc.), among other information.

As discussed herein, the membership profiles 302 and 322 may store a variety of information relating to a membership, including, but not limited to, access credentials, one or more URLs associated with a service, or billing information. In some examples, the membership profiles 302 and 322 may comprise other types of information, such as binary data (e.g., image data, video data, audio data, executable data, etc.), textual data, encrypted data, etc.

As illustrated, the membership profile 302 is comprised of a variety of data fields: a username field 304A, a password field 306A, a message importance field 308A, a billing field 310A, a payment information field 312A, a recurring field 314A, and a cancelation period field 316A. Information associated with the fields 304A-316A may be received from a keychain application (e.g., a keychain application 116 in FIG. 1), may be accessed from a service using an API or other protocol (e.g., an application programming interface 206 in FIG. 2), among other techniques. While the illustrated fields are provided as an example, it will be appreciated that a membership profile may comprise more, fewer, or different fields than are described herein. In some examples, a membership profile may have different fields as compared to other membership profiles stored by a keychain data store.

The username field 304A and password field 306A may comprise authentication information used to access or manage the service. The fields 306A and 306B may have values associated with them, such that the username for the username field 304A is "User72," as illustrated in username value 304B, and the password for the password field 306A is "JJGHA," as shown in the password value 306B. The message importance field 308A may indicate an importance associated with the electronic communication that was received as a result of completing the registration process. In another example, it may indicate an importance for electronic communications (e.g., past and/or future communications) received from the service. The message importance field 308A may have a value associated with it. In the instant example, message importance value 308B indicates a "Low" message importance. As will be appreciated, message importance may be indicated using a variety of values and/or schemes (e.g., "Low," "Medium," "High," or numeric values, etc.).

The billing field 310A may indicate whether billing information is stored or available for the membership profile 302. A value of "False" is associated with the billing information field 310A, as illustrated by the billing information value 310B. The payment field 312A, recurring field 314A, and cancelation period 316A may also relate to billing information. In some examples, if the billing field 310A indicates that billing information is not stored, the fields 312A-316A may not be present in the membership profile 302. In the instant example, the fields 312A-316A may be associated with "N/A" values 312B-316B, indicating that the fields 312A-316A are not applicable to the membership profile 302.

The keychain data store 300 may also store a membership profile 322. Similar to the membership profile 302, the membership profile 322 may be comprised of a variety of data fields: a username field 324A, a password field 326A, a message importance field 328A, a billing field 330A, a payment information field 332A, a recurring field 334A, and a cancelation period field 336A. Information associated with the fields 324A-336A may be received from a keychain application (e.g., a keychain application 116 in FIG. 1), may be accessed from a service using an API or other protocol (e.g., an application programming interface 206 in FIG. 2), among other techniques. While the membership profile 322 is shown as having similar fields to the membership profile 302, it will be appreciated that a membership profile may have similar or different fields as compared to other membership profiles in a keychain data store.

The username field 324A and password field 326A may comprise authentication information used to access or manage the service. The fields 326A and 326B may have values associated with them, such that the username for the username field 324A is "User@domain.com," as illustrated in username value 324B, and the password for the password field 326A is "%#(@)-2," as shown in the password value 326B. In some examples, a password for the password fields 306A and/or 326A may be hashed, encrypted, or otherwise secured. The message importance field 328A may indicate an importance associated with the electronic communication that was received as a result of completing the registration process. In another example, it may indicate an importance for electronic communications (e.g., past and/or future communications) received from the service. The message importance field 328A may have a value associated with it. In the instant example, message importance value 328B indicates a "High" message importance.

The billing field 330A may indicate whether billing information is stored or available for the membership profile 322. A value of "True" is associated with the billing information field 330A, as illustrated by the billing information value 330B. The payment field 332A may indicate a payment method for the service, such as a credit card as illustrated in the payment value 332B. The recurring field may provide an indication relating to the billing period for the service, which, in the instant example, is "Monthly" as indicated by recurring value 334B. The cancelation period field 336A may indicate a date or period in which the service may be cancelled. As illustrated, the service associated with the membership profile 322 may be cancelled "Every $5^{th}$ of the Month" as shown in cancelation period value 336B. In some examples, one or more of these dates may be used to generate one or more calendar entries or reminders relating to the membership profile and/or the service. In an example, at least a portion of the field and/or values stored by a membership profile (e.g., the billing information values 332B-336B of the membership profile 322) may be encrypted or otherwise secured. In another example, only a portion of the information or only some associated information may actually be stored in a membership profile (e.g., a last four digits of a credit card, a password hint rather than the password, etc.).

While FIG. 3 illustrates two membership profiles, it will be appreciated that a keychain data store may include more or fewer profiles. Additionally, specific example fields were provided for the purpose of illustration, and it will be appreciated that the technology is no so limited to the particular fields discussed herein. Indeed, fields may include: a service URL, a service name, service contact information, billing terms, features or benefits associated with a service, one or more other users of the service, an unsubscription or subscription management URL, among other fields.

Figure 4A:
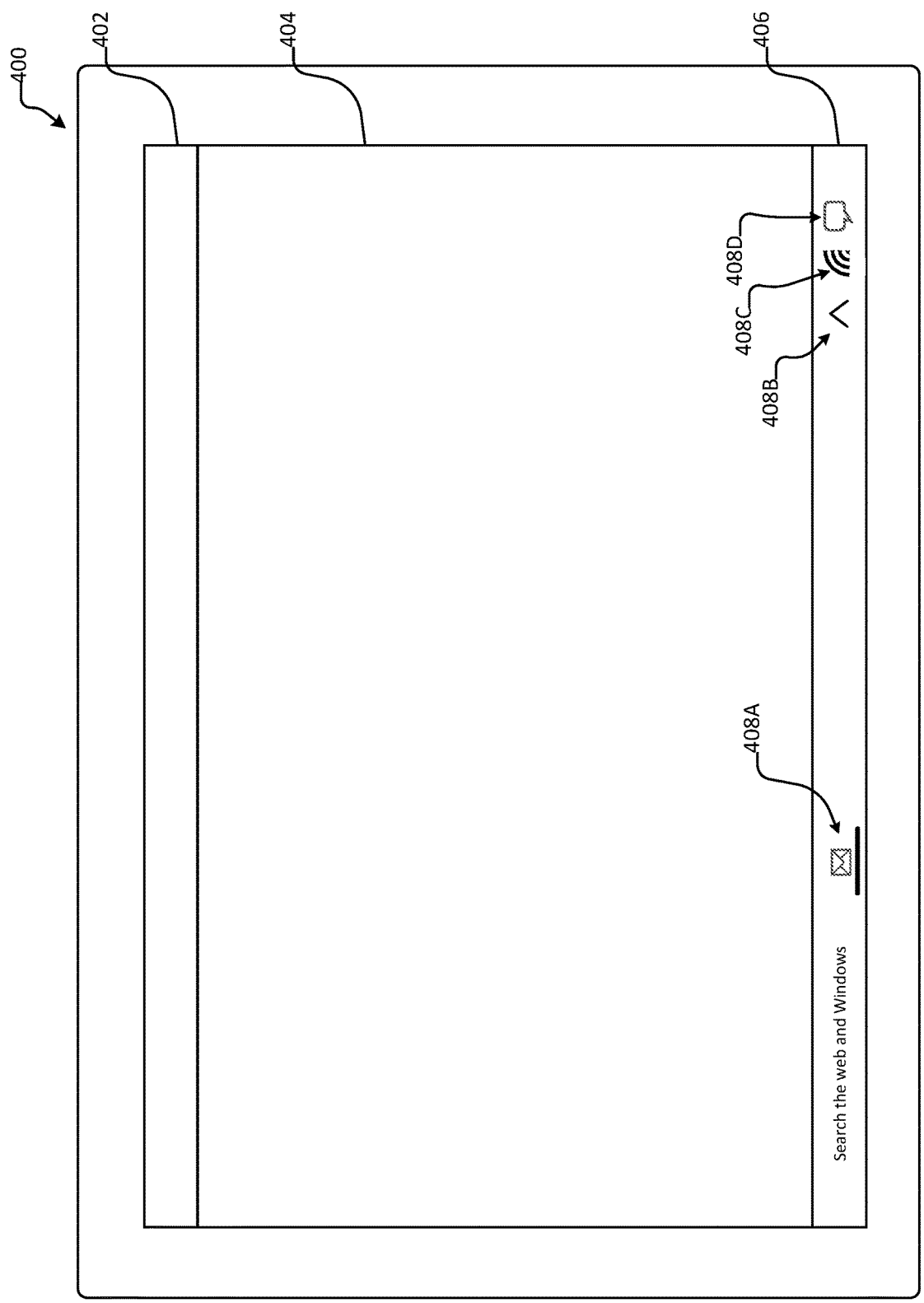
FIGS. 4A-4C illustrate overviews of an example graphical user interface (GUI) with which aspects disclosed herein may be practiced.
Figure 4B:
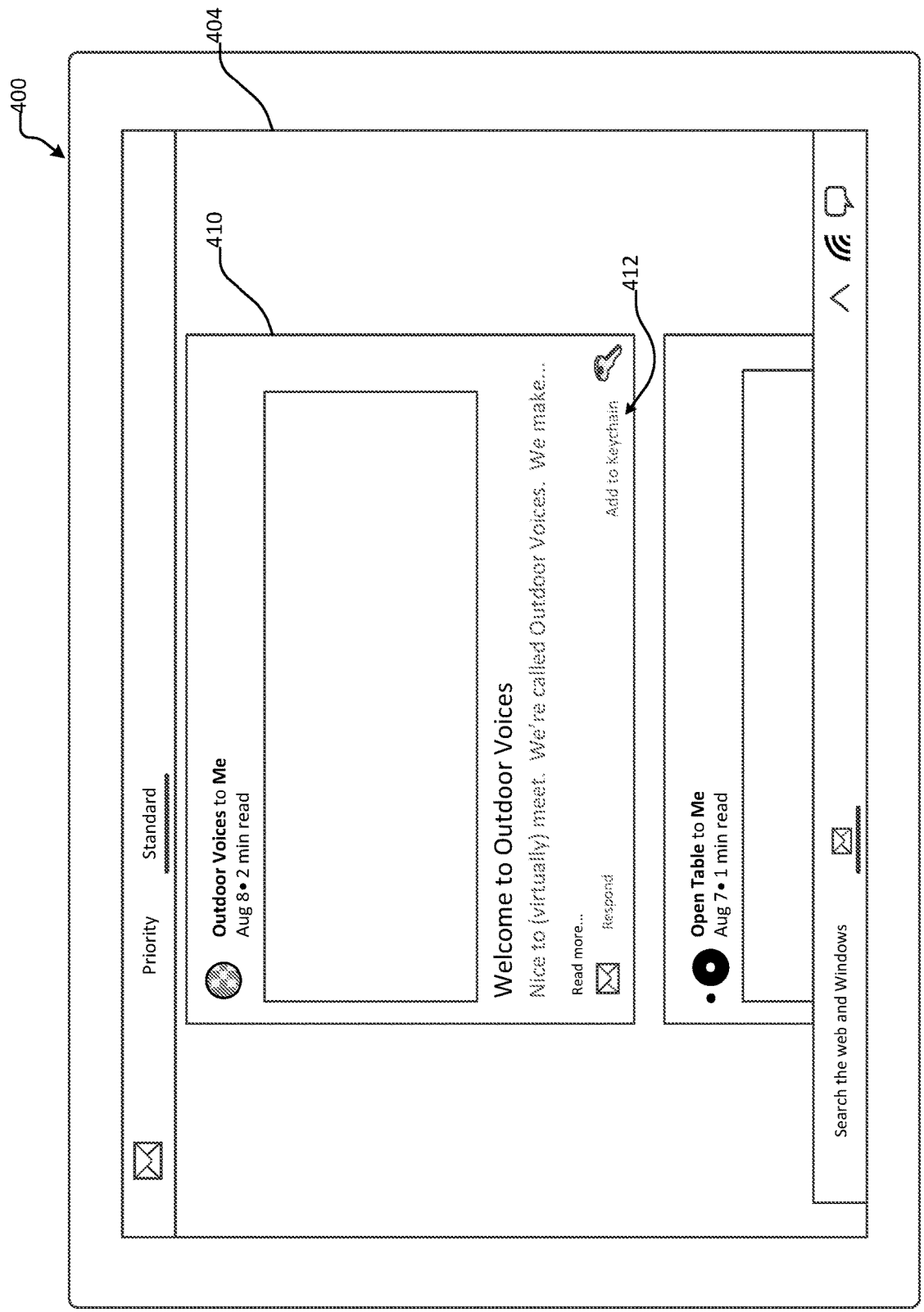
Figure 4C:
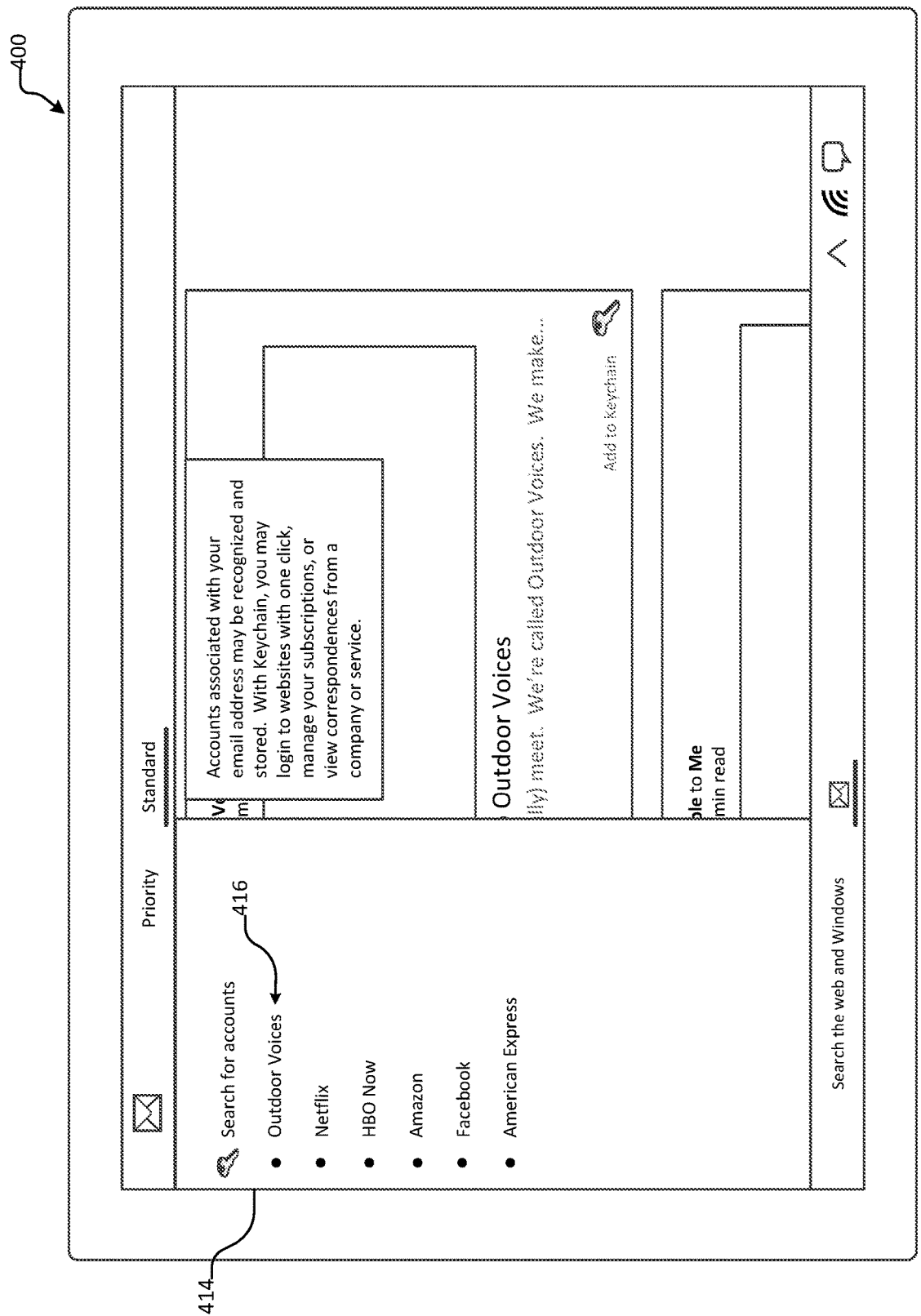

FIGS. 4A-4C illustrate overviews of an example graphical user interface (GUI) 400 with which aspects disclosed herein may be practiced. As illustrated in FIG. 4A, the GUI 400 may comprise a title bar 402, a display pane 404, and a task bar 406. Each of user interface elements 402-406 may comprise information relating to device functionality and/or one or more applications executing on a computing device (e.g., computing device 102 in FIG. 1). In an example, the title bar 402 may display various interface elements with which a user may interact in order to affect the behavior of the computing device. The display pane 404 may display content relating to an application. The task bar 406 comprises icons 408A-408D, and may provide information relating to one or more applications, the status of the computing device, among other functionality.

Icon 408A may be associated with an electronic communication application, such as a mail application (e.g., mail application 110 in FIG. 1). As shown in FIG. 4B, the application associated with icon 408A may be displayed or activated when the user interacts with icon 408A. In an example, one or more of the user interface elements 402-406 may be updated when the communication application is activated. As illustrated, the display pane 404 may be updated to display one or more messages (e.g., message 410) received by or made available to the communication application. In an example, the messages may be stored remotely (e.g., using a mail server such as the mail server 106 in FIG. 1) and accessed by the computing device. In another example, the messages may be received and/or stored locally by the application.

The message 410 may be a membership confirmation message that was generated or transmitted by a service as a result of a user completing a registration process as described herein. The message 410 may comprise data received, including a message subject, a message body, a message importance, or one or more attachments, among other data. It may be determined that the message 410 comprises membership information (e.g., by a parser such as the parser 114 in FIG. 1). As such, an "Add to Keychain" interactive element 412 may be associated or displayed with the message 410. In aspects, interacting with the interactive element 412 may cause a keychain application to present options with which a new membership profile may be generated. While the instant example illustrates a interactive element with which a user may interact to store membership information, in some examples, membership information relating to or determined from the message 410 may be automatically used to generate a membership profile. As will be appreciated, while an example interactive element 412 is provided in FIG. 4B, any indication may be used to prompt or convey such information to the user, including, but not limited to, an audible alert, different formatting of a message determined relate to a membership, or displaying such messages separately from other electronic communication messages.

With reference to FIG. 4C, a keychain application 414 may be activated (e.g., as a result of a user interaction with interactive element 412, automatically based on the occurrence of an event, based on a user preference indication, etc.). The keychain application 414 may display one or more user interface elements relating to membership profiles that are stored locally and/or remotely (e.g., in a data store such as the data store 104 and/or the data store 212 in FIGS. 1 and 2, respectively). In some examples, information relating to the membership profiles of the keychain application 414 may be stored using one or more membership profiles stored in a keychain data store, such as the membership profiles 302 and 322 stored in the keychain data store 300, as shown in FIG. 3.

As illustrated, a membership profile 416 may be generated for "Outdoor Voices" and displayed with several previously-generated membership profiles (e.g., "NETFLIX," "HBO NOW," "AMAZON," "FACEBOOK," and "AMERICAN EXPRESS.") In an example, the membership profile 416 may have been generated as a result of a user interaction with element 412 as discussed above, or it may have been stored automatically, among other events. As described herein, the membership profile 416 may comprise information relating to the message 410 from the "Outdoor Voices" service. For example, the membership profile 416 may comprise credentials (e.g., a username, a password, etc.), contact information (e.g., a support phone number or email address, a business address, etc.), billing information (e.g., a payment method, a billing schedule, etc.), among other information. In some examples, the keychain application 414 may receive and/or store information from or relating to the service (e.g., using an API similar to application programming interface 206 in FIG. 2).

Figure 5:
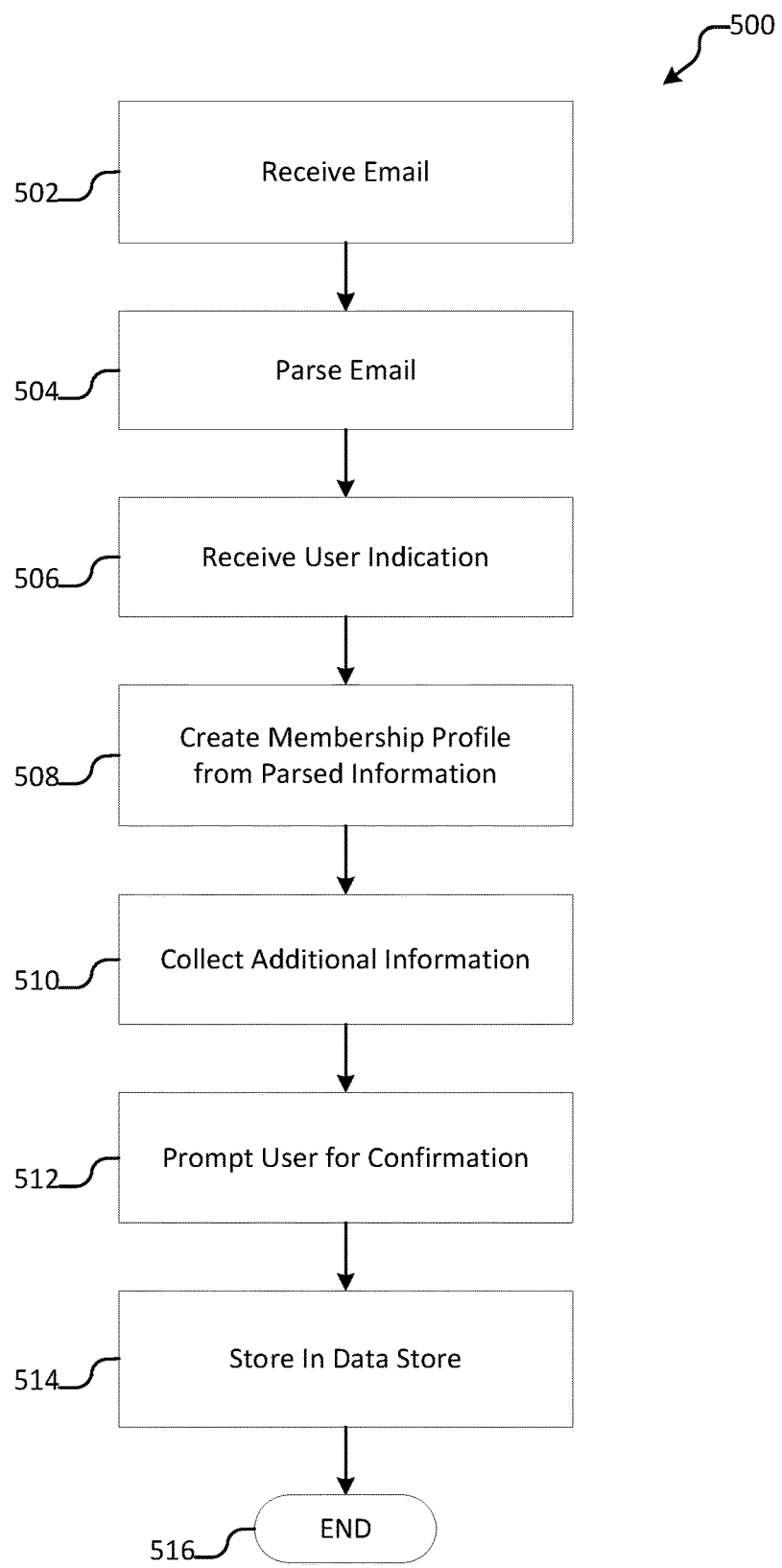
FIG. 5 illustrates an overview of an example method for identifying and storing membership information.

FIG. 5 illustrates an overview of an example method 500 for identifying and storing membership information. In an example, the method 500 may be performed by a computing device (e.g., the computing device 102 and/or one or more of the mail application 110, the parser 114, and the keychain application 116 in FIG. 1). The method 500 begins at operation 502, where an email may be received. In some examples, another form of electronic communication may be received as an alternative to or in addition to the email, including, but not limited to, an instant message, a text message, a network request (e.g., using a network protocol such as the Transport Control Protocol, the Uniform Datagram Protocol, the Hypertext Transport Protocol, etc.), among other communication methods. In other examples, receiving the message may comprise accessing the message from a remote server (e.g., the mail server 106 in FIG. 1). The email may have been received as a result of a user completing a registration process with a service.

At operation 502, the email may be parsed. Parsing the email may comprise using natural language understanding and/or pattern matching techniques to identify information within the email. As will be appreciated any of a variety of techniques may be used to parse the content of the email, as well as information associated with the email (e.g., metadata, information to which the email refers via a URL or other resource identifier, etc.). Information relating to a service membership may be identified, including, but not limited to, authentication information, billing information, or other membership information.

Moving to operation 506, a user indication may be received. The user indication may comprise an affirmation that a membership profile may be generated relating to the received email. In some examples, the user indication may comprise additional information relating to the email and/or the service, including, but not limited to, a name for the membership profile, one or more users of the service, or a folder or tags relating to the service or membership. In an example, a GUI may be displayed or updated relating to the membership profile (e.g., the keychain application 414 in FIG. 4C) as a result of the user indication. In other examples, the user indication may comprise an indication that one or more calendar entries or reminders relating to the service should be generated (e.g., relating to a cancellation or trial period, a billing date, a renewal date, etc.).

At operation 508, a membership profile may be created based on the parsed information. In an example, the membership profile may comprise a variety of fields and values, as described above with respect to the membership profiles 302 and 322 in FIG. 3. The membership profile may comprise textual data, binary data (e.g., image data, audio data, video data, etc.), encrypted data, or any other type of data. In some examples, one or more parts of the membership profile (e.g., authentication information, billing information, etc.) may be encrypted or otherwise access restricted in order to protect data relating to the service or membership.

Moving to operation 510, additional information may be collected. In an example, the additional information may be collected from an application (e.g., the browser application 112 in FIG. 1, a password manager, etc.), a data store or storage system, or a remote service, among other information sources. In another example, additional information may be received or retrieved from the service to which the membership profile relates (e.g., using an API, protocol, or other communication method as described above with respect to the application programming interface 206 in FIG. 2). The additional information may comprise authentication information, billing information, or any other information relating to the service (e.g., membership information, registration information, metadata, etc.).

At operation 512, user confirmation may be requested. The user confirmation may comprise a confirmation prompt, with which the user may confirm that the information comprised by the membership profile is correct. The confirmation prompt may also provide an option to further revise the membership profile. In some examples, the user confirmation may result from a previous preference indication (e.g., automatically generate membership profiles when an electronic communication is received from a service, generate a membership profile when one or more rules or criteria are satisfied, etc.). As will be appreciated, a variety of confirmation interactions may constitute a user confirmation.

Moving to operation 514, the membership profile may be stored in a data store. As discussed above, the data store may be local and/or remote (e.g., data store 104 and/or data store 212 in FIGS. 1 and 2, respectively). In some examples, a portion of the membership profile may be encrypted or otherwise access-restricted, as described herein. In an example, there may be multiple data stores, such that different membership profiles may be stored in different data stores, based on one or more of a variety of factors (e.g., based on which user the membership profile relates to, based on the type of service, based on the level of security associated with or required by the service, etc.). In another example, storing the membership profile may comprise generating one or more calendar entries and/or reminders relating to the service and/or membership profile. Flow terminates at operation 516.

Figure 6:
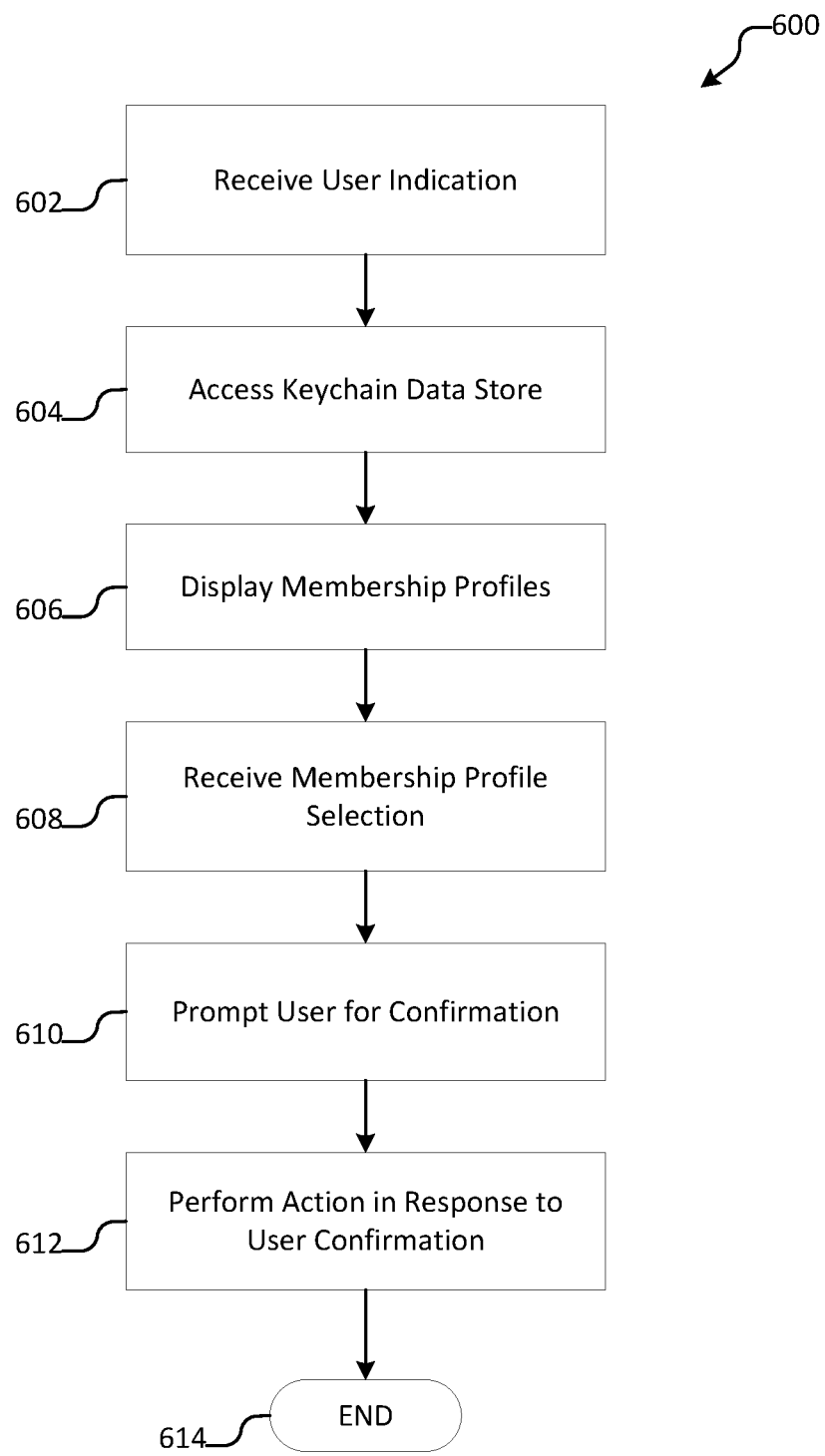
FIG. 6 illustrates an overview of an example method for retrieving stored membership information.

FIG. 6 illustrates an overview of an example method 600 for retrieving stored membership information. The method 600 may be performed by a computing device, such as the computing device 102 in FIG. 1. In some examples, the method 600 may be associated with a GUI, such as the keychain application 414 in FIG. 4C. The method 600 begins at operation 602, where a user indication may be received. The user indication may be received as a result of a user interaction with an icon (e.g., such that a keychain application is activated). In another example, the user indication may be associated with a user accessing a service (e.g., using an internet browser such as browser application 112 in FIG. 1) or as a result of receiving an electronic communication from a service (e.g., as received by the mail application 110 and/or as determined by the parser 114 in FIG. 1).

At operation 604, a keychain data store may be accessed. In an example, the keychain data store may be accessed from local or remote storage, or a combination thereof (e.g., the data store 104 and/or the data store 212 in FIGS. 1 and 2, respectively). In some examples, there may be multiple keychain data stores, or a keychain data store may comprise one or more parts, each of which may be stored locally and/or remotely. In other examples, accessing the keychain data store may comprise performing a decryption operation on at least a subpart of the keychain data store, prompting the user for a password or other access credential, among other security operations.

Moving to operation 606, one or more membership profiles of the keychain data store may be displayed. In an example, the membership profiles may be displayed in a manner similar to that of the keychain application 414 in FIG. 4C. In some examples, the membership profiles may be sorted (e.g., alphabetically, by creation time, by service type, etc.), categorized (e.g., based on one or more tags associated with each membership, based on the membership name or service type, etc.), or otherwise organized in the display.

At operation 608, a selection may be received. The selection may relate to one or more membership profiles as was displayed at operation 606. In some examples, the selection may relate to a plurality of membership profiles having one or more similar characteristics (e.g., a similar service type, a similar recurring membership fee period, etc.). Moving to operation 610, the user may be prompted for confirmation. The prompt may relate to one or more organizational actions (e.g., retagging, moving, or deleting one or more membership profiles, editing a membership profile, accessing information relating to a membership profile, unsubscribing from a service associated with a membership profile, etc.).

At operation 612, an action may be performed in response to the user interaction received at operation 610. In an example, the action may comprise displaying or editing information associated with a selected membership profile, retagging or reorganizing one or more membership profiles, among other actions. In another example, the action may comprise identifying a URL, email address, phone number, or other information stored by a membership profile and using the information to access the service (e.g. by accessing a website for the URL using a browser application such as browser application 112 in FIG. 1, by generating a new email using a mail application such as mail application 110 in FIG. 1, by calling a phone number, by issuing an unsubscription request to the service, etc.). In some examples, the user may be prompted for an authentication credential in order to access at least a part of the membership profile (e.g., a password, a cryptographic key, biometric data, etc.). Flow terminates at operation 614.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
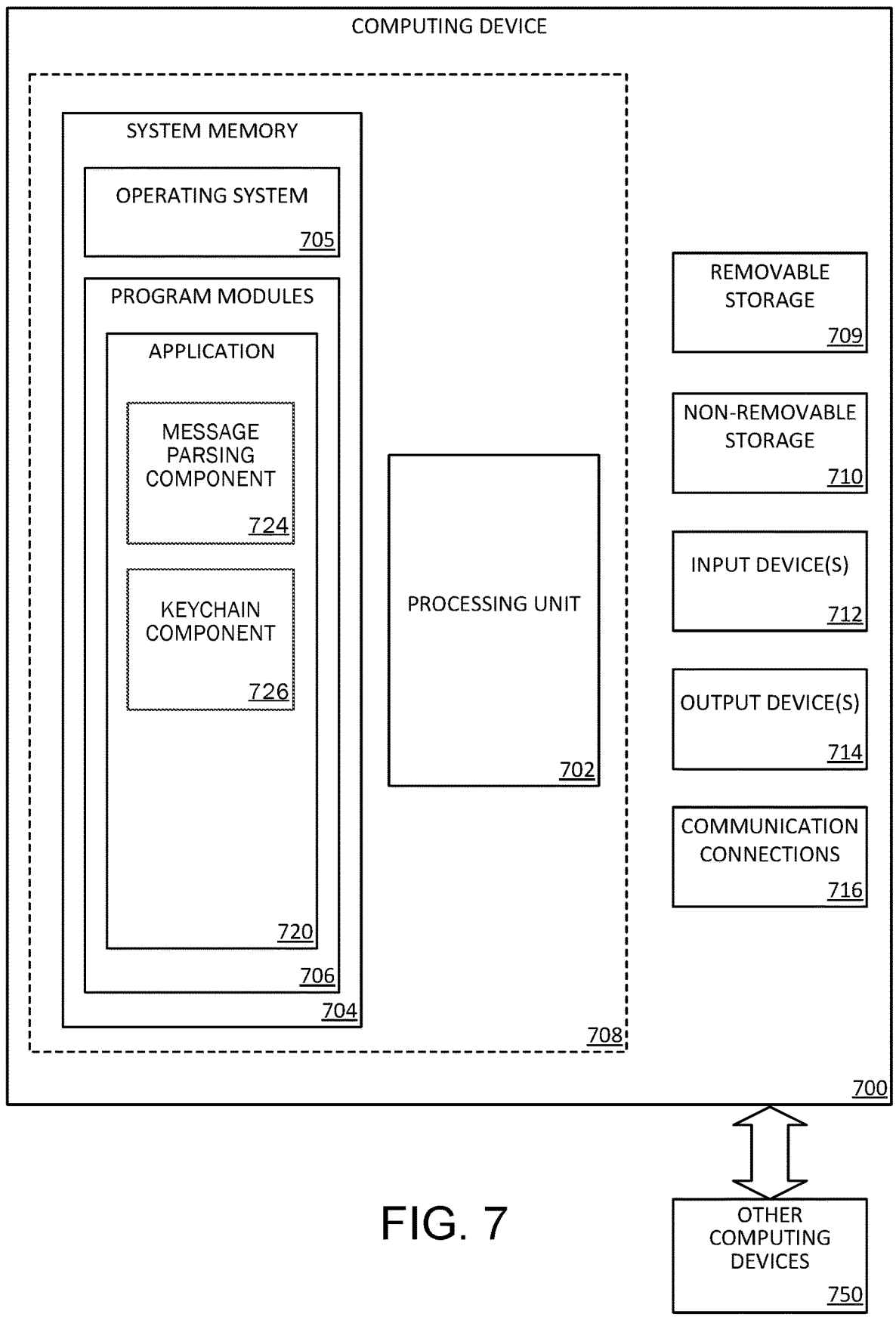
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as message parsing component 724 and keychain component 726. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
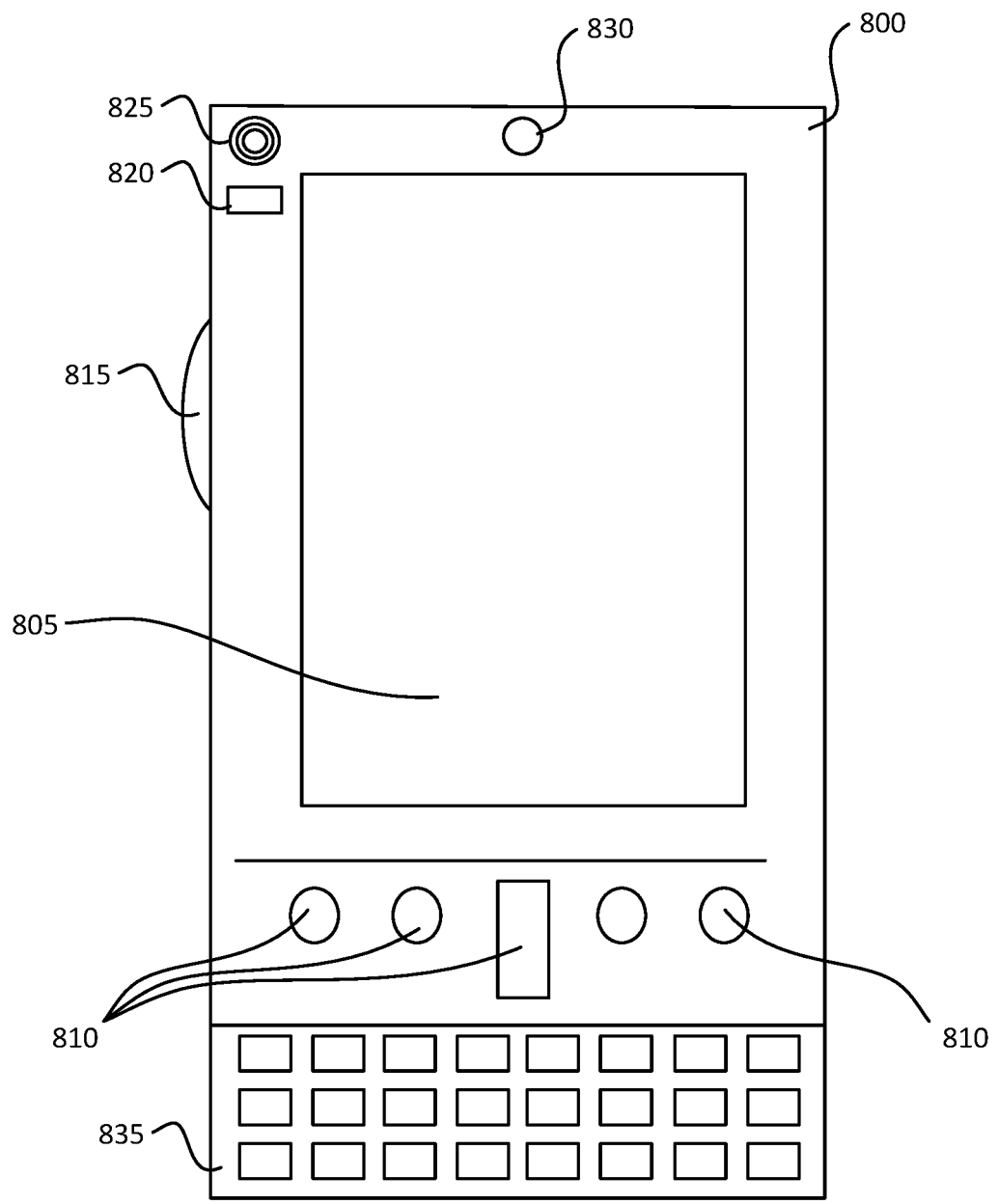
FIGS. 8A and 8B are simplified block diagrams of a mobile computing device with which aspects of the present disclosure may be practiced.
Figure 8B:
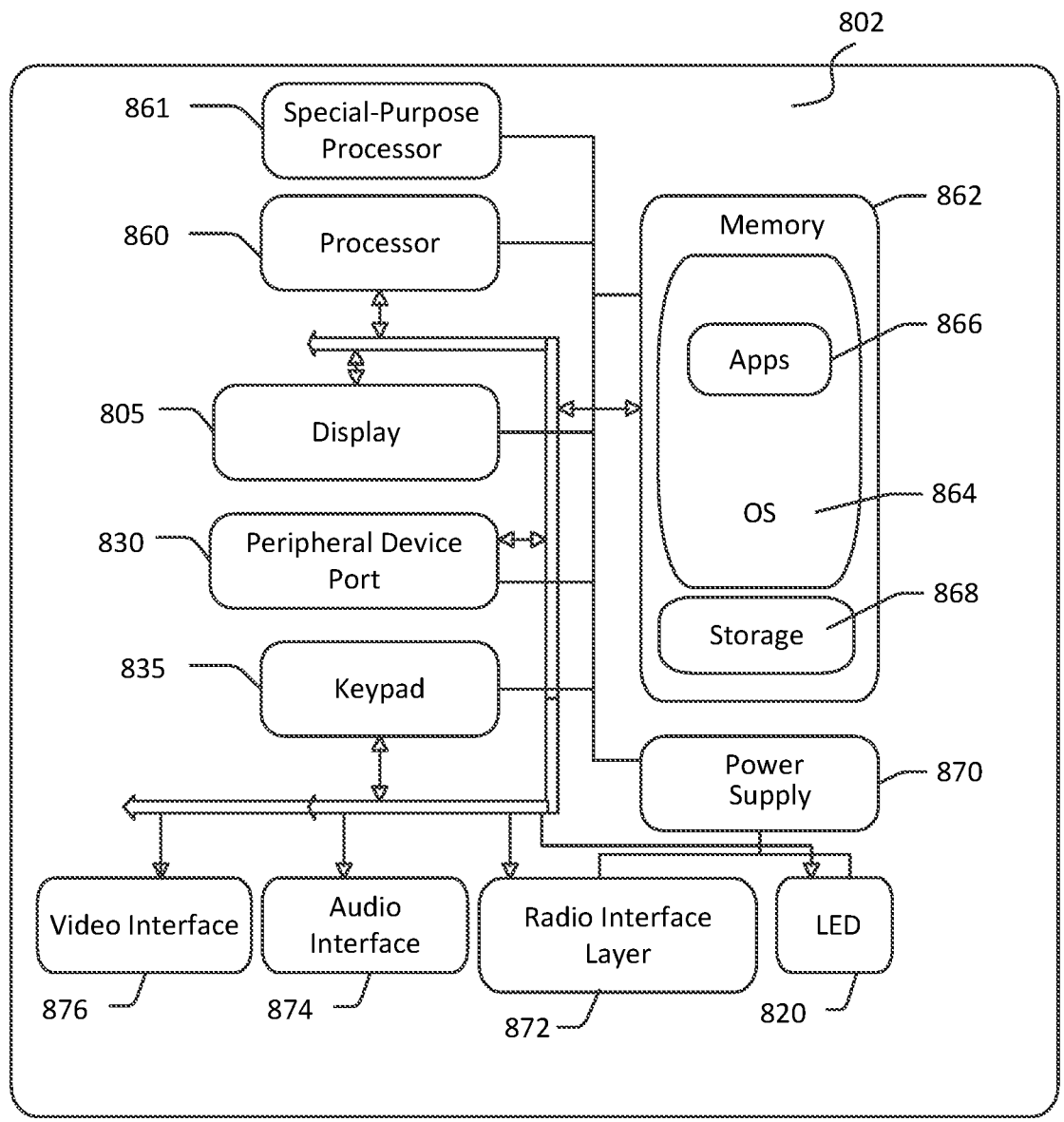

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
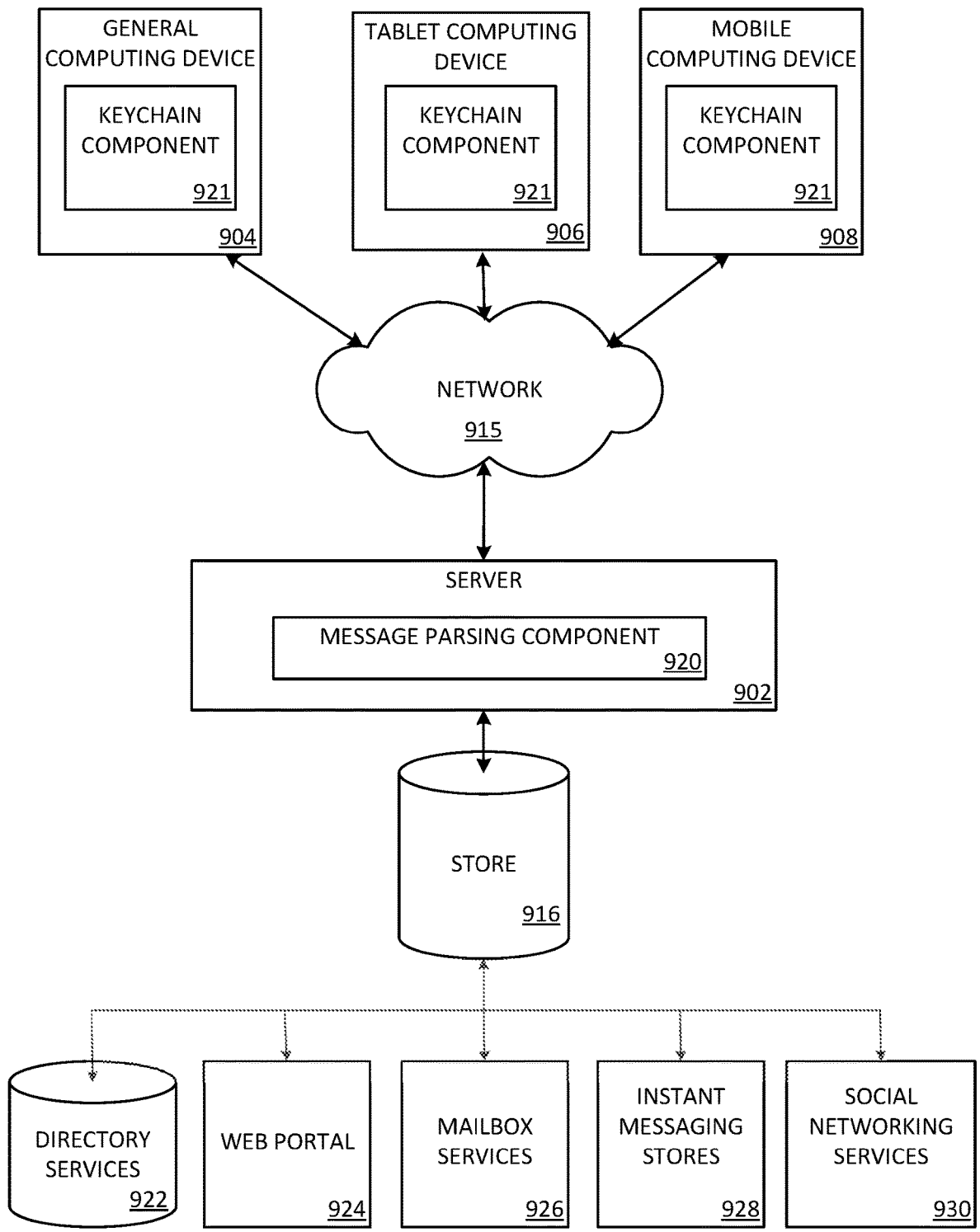
FIG. 9 is a simplified block diagram of a distributed computing system in which aspects of the present disclosure may be practiced.
Figure 10:
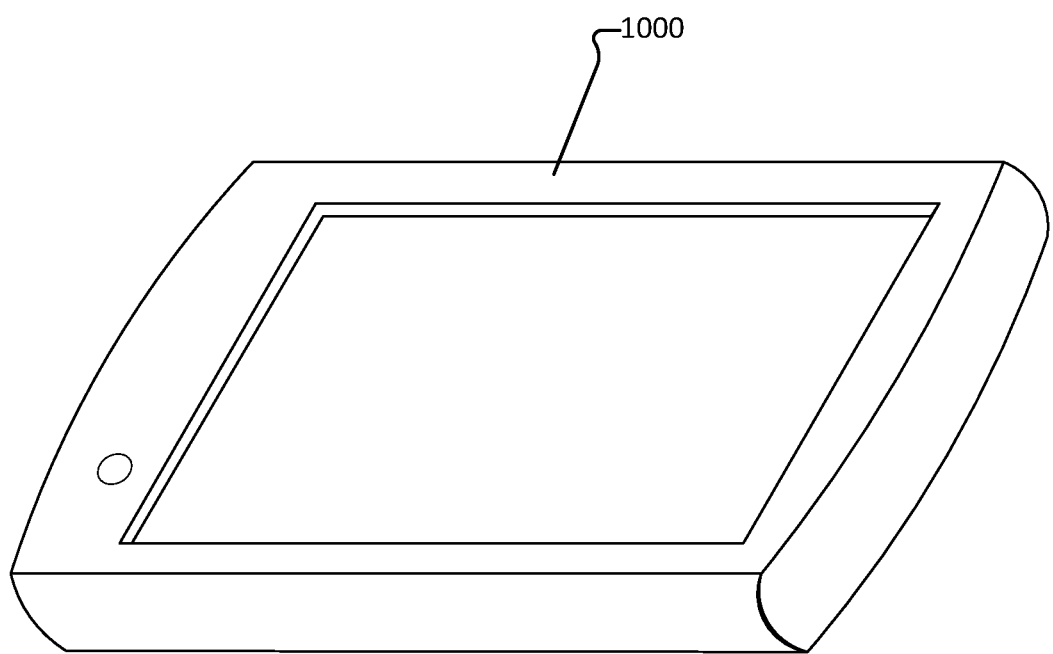
FIG. 10 illustrates a tablet computing device for executing one or more aspects of the present disclosure.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. Keychain component 921 may be employed by a client that communicates with server device 902, and/or message parsing component 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The set of operations comprises: receiving an electronic communication containing information; parsing the information to determine that the electronic communication includes membership information; identifying, from the membership information, at least one of selected from the group consisting of: a membership username, a membership website, and a membership password; providing a graphical user interface with a membership interaction element; receiving an indication of control at the membership interaction element; and based on receiving the indication of control, storing the identified at least one of selected from the group of: a membership username, a membership website, and a membership password as a membership profile. In an example, the set of operations further comprises: transmitting a request for additional membership information; receiving, in response to the request, additional membership information relating to the electronic communication; and storing at least a part of the additional membership information in the membership profile. In another example, the set of operations further comprises identifying date information in the membership information; generating, based on the identified date information, a calendar entry; and associating the calendar entry with the membership profile. In a further example, the membership profile comprises encrypting at least a part of the membership profile. In yet another example, parsing the information is performed using at least one of natural language understanding and a pattern recognition engine. In a further still example, the request for additional membership information is provided to an application executing on the at least one processor. In an example, the electronic communication is an email message.

In another aspect, the technology relates to a computer-implemented method for generating a membership profile. The method comprises: parsing an electronic communication to determine that the electronic communication includes membership information relating to a service; identifying, from the electronic communication, at least one of selected from the group consisting of: a membership username, a membership website, and a membership password; providing a graphical user interface with a membership interaction element; receiving an indication of control at the membership interaction element; and based on receiving the indication of control, storing the identified at least one of selected from the group of: a membership username, a membership website, and a membership password as the membership profile. In an example, the method further comprises: transmitting a request for additional membership information; receiving, in response to the request, additional membership information relating to the electronic communication; and storing at least part of the additional membership information in the membership profile. In another example, the method further comprises: identifying date information in the electronic communication; generating, based on the identified date information, a calendar entry; and associating the calendar entry with the membership profile. In a further example, storing the membership profile comprises encrypting at least a part of the membership profile. In yet another example, parsing the electronic communication is performed using at least one of natural language understanding and a pattern recognition engine. In a further still example, the request for additional membership information is provided to the service.

In another aspect, the technology relates to another computer-implemented method for managing membership information relating to a service. The method comprises: receiving an electronic communication from the service containing information; parsing the information to determine that the electronic communication includes membership information; identifying, from the membership information, at least one of selected from the group consisting of: a membership username, a membership website, and a membership password; providing a graphical user interface with a membership interaction element; receiving an indication of control at the membership interaction element; and based on receiving the indication of control, storing the identified at least one of selected from the group of: a membership username, a membership website, and a membership password as a membership profile. In an example, the method further comprises: transmitting a request for additional membership information; receiving, in response to the request, additional membership information relating to the electronic communication; and storing at least a part of the additional membership information in the membership profile. In another example, the method further comprises: identifying date information in the membership information; generating, based on the identified date information, a calendar entry; and associating the calendar entry with the membership profile. In a further example, storing the membership profile comprises encrypting at least a part of the membership profile. In yet another example, parsing the information is performed using at least one of natural language understanding and a pattern recognition engine. In a further still example, the request for additional membership information is provided to an application executing on the at least one processor. In an example, the electronic communication is an email message.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A system comprising:
   at least one processor; and
   a memory storing instructions that when executed by the at least one processor perform a set of operations comprising:
   receiving an electronic communication containing information;
   parsing the information to determine that the electronic communication comprises membership information associated with membership to a service;
   generating, based on determining that the electronic communication comprises membership information, a membership interaction user interface element in a user interface, the user interface further comprising a display of at least a part of the electronic communication;
   receiving an indication of an actuation of the membership interaction user interface element; and
   in response to the actuation:
   identifying, from the membership information, at least one field of information selected from a group consisting of: a membership username, a membership website, and a membership password;
   transmitting, to the service, a request for additional membership information that is additional to the identified membership information in the electronic communication;
   receiving, from the service in response to the request, additional membership information relating to the membership to the service;
   generating a membership profile for the service, wherein the membership profile comprises at least a part of the received additional membership information and the at least one field of information identified from the membership information; and
   storing the membership profile.

2. The system of claim 1, wherein the set of operations further comprises:
   identifying date information in the membership information;
   generating, based on the identified date information, a calendar entry; and
   associating the calendar entry with the membership profile.

3. The system of claim 1, wherein storing the membership profile comprises encrypting at least a part of the membership profile.

4. The system of claim 1, wherein parsing the information is performed using at least one of natural language understanding and a pattern recognition engine.

5. The system of claim 1, wherein the request for additional membership information is provided to an application executing on the at least one processor.

6. The system of claim 1, wherein the electronic communication is an email message.

7. A computer-implemented method for generating a membership profile, comprising:
   parsing an electronic communication to determine that the electronic communication comprises membership information relating to a service;
   generating, based on determining that the electronic communication comprises membership information, a graphical user interface with a display of at least a part of the electronic communication and a membership interaction user interface element;
   receiving an indication of an actuation of the membership interaction user interface element; and
   in response to the actuation:
   identifying, from the membership information, at least one field of information selected from a group consisting of: a membership username, a membership website, and a membership password;
   transmitting, to the service, a request for additional membership information that is additional to the identified membership information in the electronic communication;
   receiving, from the service in response to the request, additional membership information associated with the service;
   generating a membership profile for the service, wherein the membership profile comprises at least a part of the received additional membership information and the at least one field of information identified from the membership information; and
   storing the membership profile.

8. The computer-implemented method of claim 7, further comprising:
   identifying date information in the electronic communication;
   generating, based on the identified date information, a calendar entry; and
   associating the calendar entry with the membership profile.

9. The computer-implemented method of claim 7, wherein storing the membership profile comprises encrypting at least a part of the membership profile.

10. The computer-implemented method of claim 7, wherein parsing the electronic communication is performed using at least one of natural language understanding and a pattern recognition engine.

11. A computer-implemented method for managing membership information relating to a service, comprising:
    receiving an electronic communication from the service containing information;
    parsing the information to determine that the electronic communication comprises membership information associated with membership to a service;
    generating, based on determining that the electronic communication comprises membership information, a graphical user interface with a display of at least a part of the electronic communication and a membership interaction user interface element;
    receiving an indication of a user interaction at the membership interaction user interface element; and
    in response to the user interaction:
    identifying, from the membership information, at least one field of information selected from a group consisting of: a membership username, a membership website, and a membership password;
    transmitting, to the service, a request for additional membership information that is additional to the identified membership information in the electronic communication;
    receiving, from the service in response to the request, additional membership information relating to the membership to the service;

generating a membership profile for the service, wherein the membership profile comprises at least a part of the received additional membership information and the at least one field of information identified from the membership information; and storing the membership profile.

12. The computer-implemented method of claim 11, further comprising:

identifying date information in the membership information;

generating, based on the identified date information, a calendar entry; and associating the calendar entry with the membership profile.

13. The computer-implemented method of claim 11, wherein storing the membership profile comprises encrypting at least a part of the membership profile.

14. The computer-implemented method of claim 11, wherein parsing the information is performed using at least one of natural language understanding and a pattern recognition engine.

15. The computer-implemented method of claim 11, wherein the request for additional membership information is provided to an application associated with the service.

16. The computer-implemented method of claim 11, wherein the electronic communication is an email message.

17. The system of claim 1, wherein the identified membership information is non-confidential information and the additional membership information is confidential information.

18. The computer-implemented method of claim 7, wherein the identified membership information is non-confidential information and the additional membership information is confidential information.

19. The computer-implemented method of claim 7, wherein the request for additional membership information is provided to an application associated with the service.

20. The computer-implemented method of claim 11, wherein the identified membership information is non-confidential information and the additional membership information is confidential information.

* * * * *